US011350139B2

(12) United States Patent
Li et al.

(10) Patent No.: US 11,350,139 B2
(45) Date of Patent: May 31, 2022

(54) VIDEO LIVE BROADCAST METHOD AND APPARATUS

(71) Applicant: Huawei Technologies Co., Ltd., Shenzhen (CN)

(72) Inventors: Shizhen Li, Shenzhen (CN); Zhanyin Ma, Shenzhen (CN); Zhongjie Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 16/919,595

(22) Filed: Jul. 2, 2020

(65) Prior Publication Data

US 2020/0336769 A1 Oct. 22, 2020

Related U.S. Application Data

(63) Continuation of application No. PCT/CN2018/118501, filed on Nov. 30, 2018.

(30) Foreign Application Priority Data

Jan. 4, 2018 (CN) .................. 201810006644.X

(51) Int. Cl.
*H04N 21/2187* (2011.01)
*H04L 9/06* (2006.01)
*H04N 21/222* (2011.01)
*H04N 21/231* (2011.01)

(52) U.S. Cl.
CPC ....... *H04N 21/2187* (2013.01); *H04L 9/0637* (2013.01); *H04N 21/2223* (2013.01); *H04N 21/23116* (2013.01)

(58) Field of Classification Search
CPC .......... H04N 21/2187; H04N 21/2223; H04N 21/23116; H04L 9/0637
See application file for complete search history.

(56) References Cited

U.S. PATENT DOCUMENTS

| 9,819,972 | B1 | 11/2017 | Vantalon et al. | |
|---|---|---|---|---|
| 2014/0095804 | A1 | 4/2014 | Lientz | |
| 2014/0215546 | A1 | 7/2014 | Willis et al. | |
| 2014/0304367 | A1 | 10/2014 | Fletcher | |
| 2014/0330924 | A1* | 11/2014 | Lientz | G06F 16/172 709/213 |
| 2016/0294971 | A1* | 10/2016 | Li | H04L 47/125 |
| 2017/0155928 | A1 | 6/2017 | Wei | |
| 2017/0302463 | A1* | 10/2017 | Larumbe | H04L 65/608 |
| 2018/0343110 | A1* | 11/2018 | Funk | H04L 9/0838 |

FOREIGN PATENT DOCUMENTS

| CN | 102055808 A | 5/2011 |
|---|---|---|
| CN | 102195788 A | 9/2011 |
| CN | 103096170 A | 5/2013 |
| CN | 104735044 A | 6/2015 |

(Continued)

*Primary Examiner* — Joshua D Taylor
(74) *Attorney, Agent, or Firm* — Conley Rose, P.C.

(57) ABSTRACT

A video live broadcast method and an apparatus, where when a regional node receives a video request from a video playing client but does not have a corresponding video stream, information about a regional node that has the video stream is learned by searching the live broadcast record table, and then a stream is pulled from the regional node.

20 Claims, 6 Drawing Sheets

(56) References Cited

FOREIGN PATENT DOCUMENTS

| | | | |
|---|---|---|---|
| CN | 105915944 | A | 8/2016 |
| CN | 106803974 | A | 6/2017 |
| JP | 2008234206 | A | 10/2008 |
| JP | 2017204707 | A | 11/2017 |
| WO | 2012152771 | A2 | 11/2012 |

\* cited by examiner

VIDEO LIVE BROADCAST METHOD AND APPARATUS

CROSS-REFERENCE TO RELATED APPLICATIONS

This application is a continuation of International Patent Application No. PCT/CN2018/118501 filed on Nov. 30, 2018, which claims priority to Chinese Patent Application No. 201810006644.X filed on Jan. 4, 2018. The disclosures of the aforementioned applications are hereby incorporated by reference in their entireties.

TECHNICAL FIELD

The present disclosure relates to the field of network data transmission technologies, and in particular, to the field of video live broadcast technologies.

BACKGROUND

With rapid development of Internet technologies, a video live broadcast service becomes more popular. However, as the video live broadcast service has increasingly high requirements for definition and delay, and covers an increasingly wide geographical range, related technologies such as compression and transmission of a live data stream still face great challenges.

A current mainstream streaming media transmission protocol is a Real Time Messaging Protocol (RTMP) of ADOBE. The RTMP is based on a Transmission Control Protocol (TCP), and is a network protocol designed to perform real-time data communication. Audio, video, and data communication may be performed between a platform such as FLASH and AIR of ADOBE and a streaming media or an interaction server that supports the RTMP. The RTMP is widely used in the field of video live broadcast. At present, most live broadcast products in the market use this protocol.

Hypertext Transfer Protocol (HTTP) live streaming (HLS) is an HTTP streaming media-based network transmission protocol proposed by APPLE Inc., and is a part of QUICKTIME and IPHONE software systems of APPLE Inc. The HLS works by splitting an entire video stream into small HTTP-based files for downloading, with only a few files downloaded each time. When a media stream is being played, a client may choose to download a same resource from many different backup sources at different rates, allowing a streaming media session to adapt to different data rates.

In a process of performing live broadcast using the RTMP, when a video collection client pushes a stream of a live video, a server needs to have a corresponding stream receiving module to receive the video stream. According to the RTMP, there are two prerequisite steps for receiving streaming media first, establishing a net connection, and second, establishing a net stream. The network connection represents a basic connection between a server-side application and the client, and the network stream represents a channel for sending multimedia data. Only one network connection can be established between the server and the client, but many network streams can be created based on this connection. After the network stream is established, the server can receive a valid video stream pushed by the client.

Currently, a content delivery network (CDN) is usually used to receive and deliver video streams. To be specific, regional nodes deployed in different places perform load balancing, content delivery, and scheduling using a central node such that a user obtains required content nearby. This improves a response speed and a hit rate of user access. However, when the CDN is used to receive and deliver video streams, if the video collection client is close to a video playing client, and the video collection client and the video playing client are far away from the central node, a transmission path of a video stream increases because the video stream needs to pass through the central node during transmission, and this reduces efficiency of a video live broadcast system.

SUMMARY

Embodiments of this application provide a video live broadcast method and an apparatus for implementing the method, to resolve a problem that a transmission path of a video stream increases because the video stream needs to pass through a central node, and this reduces efficiency.

According to a first aspect, this application provides a video live broadcast method, and the video live broadcast method is implemented using a video live broadcast system. The video live broadcast system includes a regional node cluster including at least two regional nodes, and each regional node is configured to connect a video live broadcast client in a region of the regional node. The video live broadcast client may be used as a video collection client, or a video playing client. The video live broadcast method includes receiving, by a first regional node, a video stream sent by a video live broadcast client in a region managed by the first regional node, and triggering a process of determining, from the regional node cluster to which the first regional node belongs, an active management node corresponding to the video stream, where after the active management node is determined, the active management node records live broadcast information of the video stream in a live broadcast record table stored by the active management node, and synchronizes the live broadcast information of the video stream in a live broadcast record table of another regional node in the regional node cluster, and the live broadcast information of the video stream includes an identifier of the video stream and information about the first regional node, receiving, by the first regional node, a video request sent by a second regional node, where the video request carries the identifier of the video stream, the second regional node is a regional node that is in the regional node cluster and that is of a region in which a video playing client configured to request for the video stream is located, and the regional node sends the video request to the first regional node based on the live broadcast information of the video stream recorded in a live broadcast record table stored by the regional node, and after receiving the video request, sending, by the first regional node, the video stream sent by the video collection client to the second regional node.

In the foregoing solution, after a regional node receives a video request sent by the video playing client, if the regional node does not have a video stream requested by the video playing client, the regional node may learn, by searching live broadcast information of the video stream recorded in a live broadcast record table stored by the regional node, information about a regional node that has the video stream, and may directly pull a stream from the regional node that has the video stream. In this way, the video live broadcast system does not need a conventional central node, and this enhances stability of the system. In addition, the following problem is resolved. When the video collection client and the video playing client are far away from the central node, a transmission path of the video stream increases because a video stream needs to pass through the central node, and this reduces efficiency of the video live broadcast system.

According to the first aspect, in a possible implementation, when the first regional node triggers the process of determining, from the regional node cluster, the active management node corresponding to the video stream, the process includes broadcasting, by the first regional node and in the regional node cluster, information about the video stream and the information about the regional node, which are received by the first regional node such that the regional nodes in the regional node cluster perform a contention operation to determine the active management node, sending, by the active management node, a verification request to the other regional node in the regional node cluster, and sending, by the other regional node in the regional node cluster, a verification confirmation message to the active management node, where the verification confirmation message indicates that the other regional node in the regional node cluster agrees that the active management node is used as a recorder of current live broadcast information. In this way, a regional node with a strongest computing capability may be selected from the regional node cluster as the active management node, and the selected active management node needs to be agreed by the other regional node. This ensures efficiency of the video live broadcast system.

Optionally, when the active management node records the live broadcast information of the video stream in the live broadcast record table stored by the active management node, and synchronizes the live broadcast information of the video stream in the live broadcast record table of the other regional node in the regional node cluster, the active management node and the other regional node in the regional node cluster may store, using a blockchain account book, the live broadcast information of the video stream in the live broadcast record tables stored by the active management node and the other regional node in the regional node cluster. In this way, security of the information in the stored live broadcast record tables can be improved.

According to the first aspect, in another possible implementation, the first regional node receives stop information of the video stream sent by the video collection client, and triggers a process of determining, from the regional node cluster, an active management node corresponding to the stop information of the video stream. After the active management node is determined, the active management node records the stop information of the video stream in a live broadcast record table stored by the active management node, and synchronizes the stop information of the video stream in another live broadcast record table in the regional node cluster. In this way, after live broadcast is stopped, all regional nodes in the video live broadcast system synchronize the stop information of the video stream. When a video playing client requests for the video stream, a regional node that receives a live broadcast request may notify the video playing client that live broadcast of the video stream is stopped.

Optionally, when the active management node records the stop information of the video stream in the live broadcast record table stored by the active management node, and stores the stop information of the video stream in the other live broadcast record table in the regional node cluster, the active management node and the other regional node in the regional node cluster may store, using a blockchain account book, the stop information of the video stream in the live broadcast record tables stored by the active management node and the other regional node in the regional node cluster.

According to the first aspect, in another possible implementation, the triggering, by the first regional node, a process of determining, from the regional node cluster, an active management node corresponding to the video stream includes sending, by the first regional node, a query request to a central node such that the central node uses a regional node with a highest priority in the regional node cluster as the active management node, and receiving, by the first regional node, response information from the central node, where the response information carries information about the selected regional node with the highest priority. In this way, the active management node can be quickly selected. In addition, because the video stream does not need to pass through the central node, the following problem is resolved: A transmission path increases because the video stream passes through the central node, and this reduces efficiency of the video live broadcast system.

Optionally, when the active management node records the live broadcast information of the video stream in the live broadcast record table stored by the active management node, and synchronizes the live broadcast information of the video stream in the live broadcast record table of the other regional node in the regional node cluster, the active management node and the other regional node in the regional node cluster may store, using a linked list, the live broadcast information of the video stream in the live broadcast record tables stored by the active management node and the other regional node in the regional node cluster. In this way, storage space of the regional node can be better used, and the efficiency of the video live broadcast system is improved.

According to the first aspect, in another possible implementation, the first regional node receives stop information of the video stream sent by the video collection client, and sends the stop information of the video stream to the regional node with the highest priority such that the regional node with the highest priority writes the stop information of the video stream into a live broadcast record table of the regional node with the highest priority, and the regional node with the highest priority records the stop information of the video stream in the live broadcast record table stored by the regional node with the highest priority, and synchronizes the stop information of the video stream in the live broadcast record table of the other regional node in the regional node cluster. In this way, after live broadcast is stopped, all regional nodes in the video live broadcast system synchronize the stop information of the video stream. When a video playing client requests for the video stream, a regional node that receives a video request may notify the video playing client that live broadcast of the video stream is stopped.

Optionally, when the regional node with the highest priority records the stop information of the video stream in the live broadcast record table stored by the regional node with the highest priority, and stores the stop information of the video stream in the other live broadcast record table in the regional node cluster, the regional node with the highest priority and the other regional node in the regional node cluster may store, using a linked list, the stop information of the video stream in the live broadcast record tables stored by the regional node with the highest priority and the other regional node in the regional node cluster.

According to a second aspect, this application provides a regional node in a video live broadcast system. The video live broadcast system includes a regional node cluster including at least two regional nodes, and each regional node is configured to connect to a video live broadcast client in a region of the regional node. The regional node includes a receiving module, a triggering module, and a sending module. The receiving module is configured to receive a video stream sent by a video collection client in a region managed by a first regional node, the triggering module is configured to trigger a process of determining, from the regional node cluster, an active management node corresponding to the video stream, where after the active management node is determined, the active management node records live broadcast information of the video stream in a live broadcast record table stored by the active management node, and synchronizes the live broadcast information of the video stream in a live broadcast record table when broadcasting the live broadcast information of the video stream to another regional node in the regional node cluster, and the live broadcast information of the video stream includes an identifier of the video stream and information about the first regional node, the receiving module is further configured to receive a video request sent by a second regional node, where the video request carries the identifier of the video stream, the second regional node is a regional node that is in the regional node cluster and that is of a region in which a video playing client configured to request for the video stream is located, and the regional node sends the video request based on the live broadcast information of the video stream in a live broadcast record table stored by the regional node, and the sending module is configured to send, according to the video request, the video stream sent by the video collection client to the second regional node.

According to the second aspect, in another possible implementation, when the triggering module triggers the process of determining, from the regional node cluster, the active management node corresponding to the video stream, the triggering module is further configured to broadcast, in the regional node cluster, information about the video stream and the information about the first regional node such that the regional nodes in the regional node cluster perform a contention operation to determine the active management node, after receiving a verification request sent by the active management node, send a verification confirmation message to the active management node, where the verification confirmation message indicates that the other regional node in the regional node cluster agrees that the active management node is used as a recorder of current live broadcast information, and receive a verification request sent by the active management node to the other regional node in the regional node cluster.

Optionally, that the triggering module synchronizes the live broadcast information of the video stream in a live broadcast record table means to store, using a blockchain account book, the live broadcast information of the video stream in a live broadcast record table stored by the triggering module.

According to the second aspect, in another possible implementation, the receiving module is further configured to receive stop information of the video stream sent by the video collection client, and the triggering module is further configured to trigger a process of determining, from the regional node cluster, an active management node corresponding to the stop information of the video stream, where after the active management node is determined, the active management node records the stop information of the video stream in a live broadcast record table stored by the active management node, and synchronizes the stop information of the video stream in the live broadcast record table when broadcasting the stop information of the video stream to the other regional node in the regional node cluster.

According to the second aspect, in another possible implementation, when the triggering module triggers the process of determining, from the regional node cluster, the active management node corresponding to the video stream, the triggering module is further configured to send a query request to a central node such that the central node uses a regional node with a highest priority in the regional node cluster as the active management node, and receive response information from the central node, where the response information carries information about the regional node with the highest priority.

Optionally, that the triggering module synchronizes the live broadcast information of the video stream in a live broadcast record table means to store, using a linked list, the live broadcast information of the video stream in the live broadcast record table stored by the triggering module.

According to the second aspect, in another possible implementation, the receiving module is further configured to receive stop information of the video stream sent by the video collection client, and the sending module is further configured to send the stop information of the video stream to the regional node with the highest priority such that the regional node with the highest priority writes the stop information of the video stream into the live broadcast record table stored by the regional node with the highest priority, and the triggering module is further configured to when the regional node with the highest priority records the stop information of the video stream in the live broadcast record table stored by the regional node with the highest priority, and broadcasts the stop information of the video stream to the other regional node in the regional node cluster, synchronizes the stop information of the video stream in the live broadcast record table.

According to a third aspect, this application provides a server, applied to a regional node in a video live broadcast system. The server includes a memory and a processor. The memory stores program code, and the processor is configured to invoke the program code in the processor to perform the video live broadcast method according to the first aspect of this application.

DESCRIPTION OF EMBODIMENTS

To make the objectives, technical solutions, and advantages of this application more understandable, the following provides detailed descriptions. The detailed descriptions provide various embodiments of a device and/or a process using block diagrams, flowcharts, and/or examples. These block diagrams, flowcharts, and/or examples include one or more functions and/or operations, so persons in the art may understand that each function and/or operation in the block diagrams, the flowcharts, and/or the examples may be performed independently and/or jointly using much hardware, software, and firmware, and/or any combination thereof.

Terms included in this application are as follows.

Figure 1:
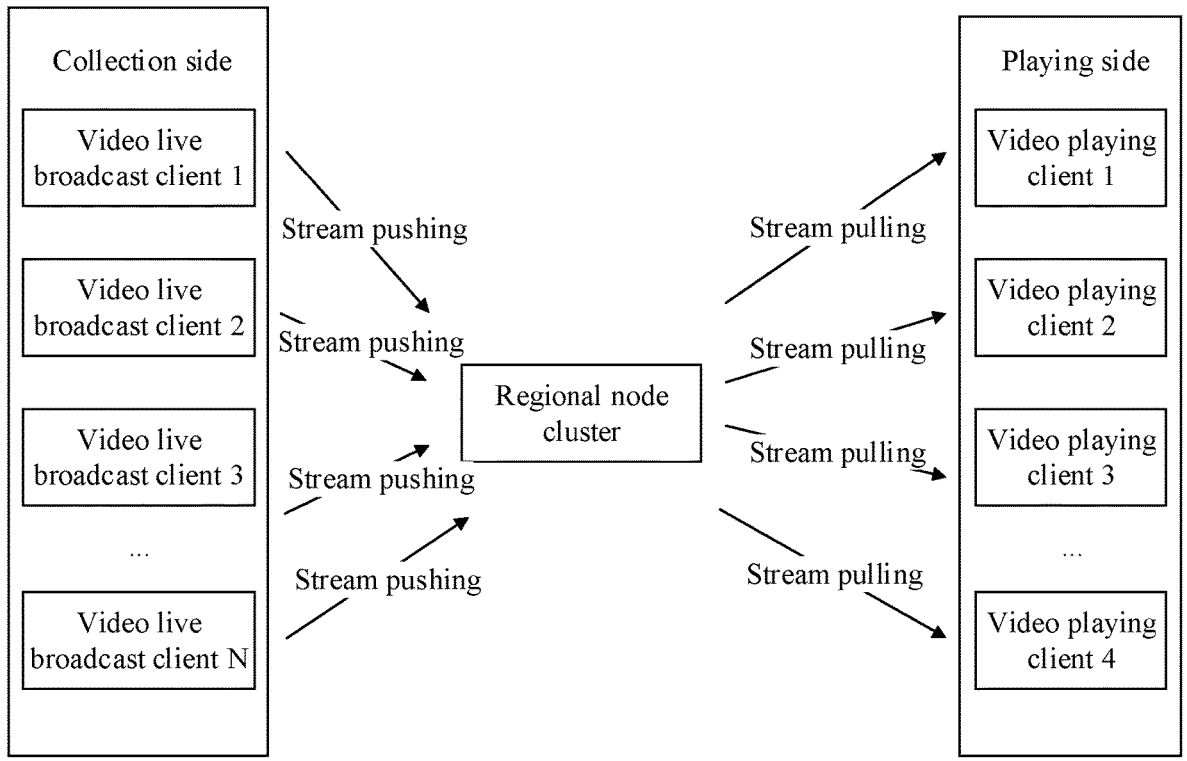
FIG. 1 is a schematic diagram of a stream pushing process and a stream pulling process of a video stream according to an embodiment of this application.

As shown in FIG. 1, to implement normal watching of a live stream, a video live broadcast method is divided into a stream pushing process of a video stream and a stream pulling process of a live stream.

Stream pushing: A video collection client pushes a collected video stream to any regional node in a regional node cluster using a video stream pushing process, in addition, stream pushing may also indicate a process in which one regional node sends a video stream to another regional node.

Stream pulling: A video playing client can obtain a video stream stored on a regional node using a video stream pulling process such that a terminal device can watch the video stream, in addition, stream pulling may also indicate a process in which one regional node requests another regional node to send a video stream to the one regional node.

Central node: A central node is used to implement functions such as load balancing, content delivery, and scheduling in a video live broadcast system, and retrieves content when the content is missed on a regional node, to manage the entire video live broadcast system.

Regional node: A regional node manages video live broadcast clients in a specified region and stores some hotspot data, to provide a nearby content access service for a user.

Figure 2:
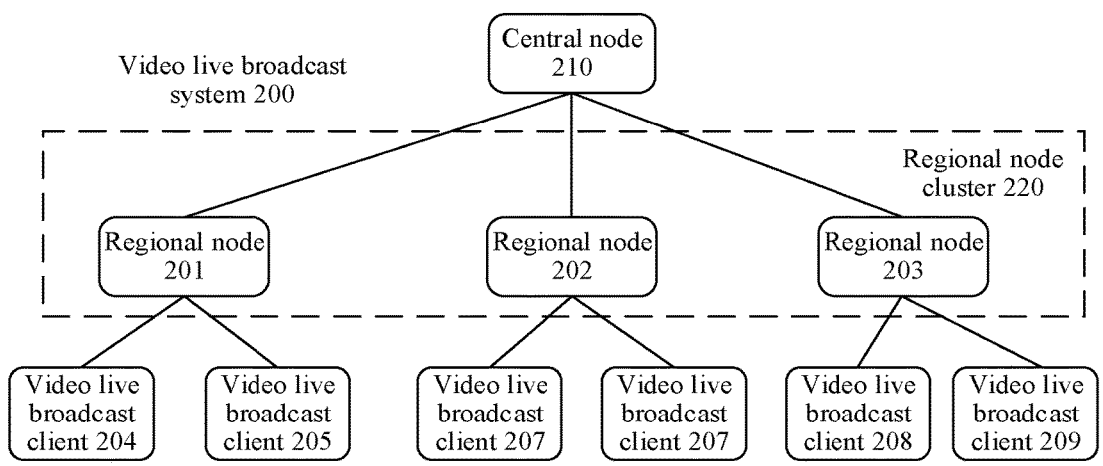
FIG. 2 is a schematic diagram of composition of a video live broadcast system established using a CDN technology.

FIG. 2 shows a video live broadcast system 200 established using a CDN technology. As shown in FIG. 2, a central node 210 is connected to several regional nodes (a regional node 201, a regional node 202, and a regional node 203 in the figure), and these regional nodes form a regional node cluster 220. The regional nodes are used to pull and receive video streams in regions of the regional nodes. Several video live broadcast clients (e.g., a video live broadcast clients 204, 205, 207, 208, and 209) are connected to the regional nodes. These video live broadcast clients may be used as video collection clients or video playing clients. When the video live broadcast clients are used as video collection clients, live broadcasters perform live broadcast using the video collection clients, and the video collection clients push streams and send processed video streams to nearest regional nodes. When used as video playing clients, the video live broadcast clients are used by users to watch live programs. The video live broadcast client may have a plurality of forms, for example, may be a portable device connected to a WI-FI or a cellular network, or may be a personal computer (PC) connected to a fixed network.

When the video live broadcast system uses a CDN to receive and deliver video streams, a video collection client first sends the video streams to the central node through a corresponding regional node. After a video playing client sends a video request, the video request is sent to the central node through a regional node. Then, the central node sends, according to the video request, a corresponding video stream to the video playing client using a regional node corresponding to the video playing client. When the CDN is used to receive and deliver video streams, if the video collection client is close to the video playing client, and the video collection client and the video playing client are far away from the central node, a transmission path of a video stream increases because the video stream needs to pass through the central node during transmission, and this reduces efficiency of the video live broadcast system.

The following describes in detail a specific implementation scenario and method of this application.

Figure 3:
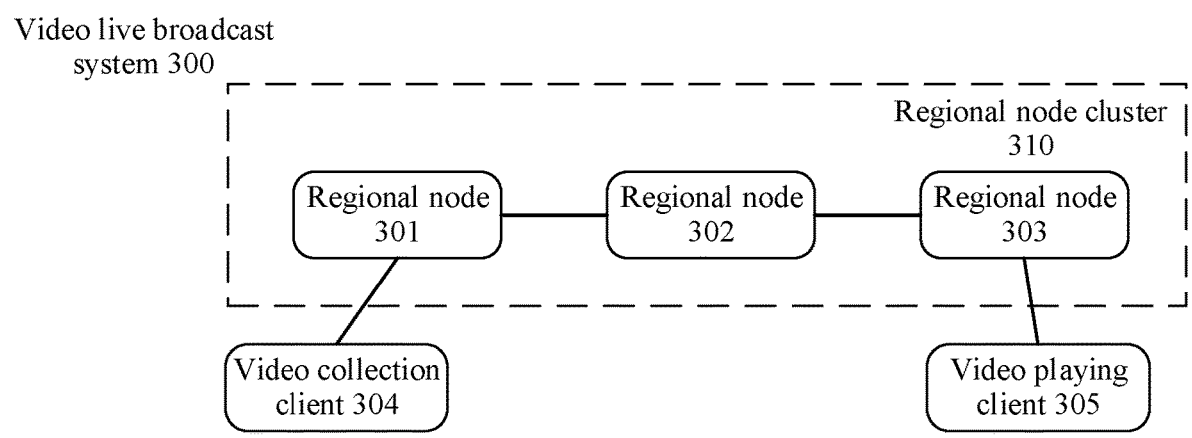
FIG. 3 is a schematic diagram of composition of a video live broadcast system according to a first embodiment of this application.

FIG. 3 is a block diagram of composition of a video live broadcast system according to a first embodiment of this application. As shown in FIG. 3, a video live broadcast system 300 includes a regional node cluster 310 including a regional node 301, a regional node 302, and a regional node 303, a video collection client 304, and a video playing client 305 (there are three regional nodes shown in the figure, and an actual quantity may be two or more). The regional nodes are used to pull and receive video streams in regions of the regional nodes. The video collection client 304 and the regional node 301 are in a same region, and the video playing client 305 and the regional node 303 are in a same region.

Figure 4:
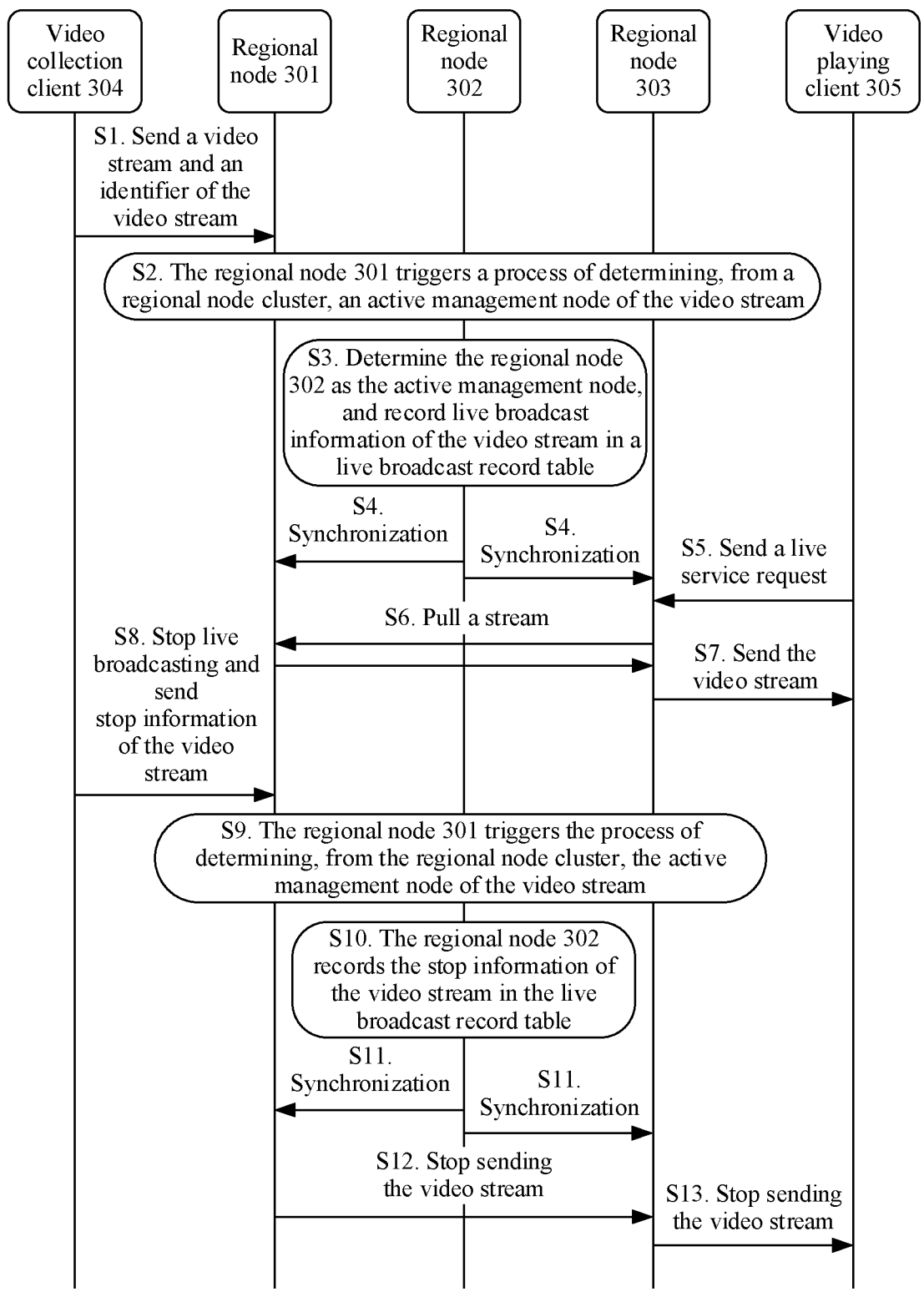
FIG. 4 is a schematic flowchart according to a first embodiment of this application.

FIG. 4 is a schematic flowchart according to the first embodiment of this application. As shown in FIG. 4, specific steps are as follows.

Step S1: The video collection client 304 collects video streams uploaded by a live broadcaster, and generates identifiers of corresponding video streams. The video streams and the identifiers of the video streams are in one-to-one correspondence, and the corresponding video streams may be found using the identifiers of the video streams. In different video live broadcast systems, an identifier of a video stream may include different content. For example, the identifier of the video stream may include registration information of the live broadcaster in the video live broadcast system, a network address of the video collection client, status information of the video stream, and the like.

The video collection client 304 finds the nearest regional node 301 by means of intelligent Domain Name System (DNS) resolution or Internet Protocol (IP) address library intelligent indexing, and sends the video stream and the identifier of the video stream to the regional node 301. The video stream and the identifier of the video stream may be sent at the same time or at different time points. The intelligent DNS resolution means that a plurality of regional nodes is deployed globally for a live broadcast service and a same domain name is used to allow a client user to access the service. In addition, each region has its own DNS server using a global load balancing domain name resolution system. Domain name resolution requests of terminals in different regions are resolved by corresponding regional DNS servers, to obtain an IP address of a nearest live broadcast server. In this way, the intelligent DNS resolution allows the user to access different regional nodes based on a geographical location of the user. The IP address library intelligent indexing means that each IP address corresponds to one or more physical addresses, and a large number of IP addresses and corresponding geographical information form an IP address library. Intelligent indexing of the IP address library is established to ensure, as accurately as possible, that global users can access a server of the nearest regional node.

Step S2: When receiving the video stream sent by the video collection client 304 and the identifier of the video stream, the regional node 301 locally stores the video stream, and triggers a process of determining, from the regional node cluster, an active management node in the regional nodes. Further, the regional node 301 broadcasts the received identifier of the video stream to all the regional nodes in the regional node cluster such that all the regional nodes including the regional node 301 perform a contention operation according to a preset rule. First, a regional node that first calculates a result and succeeds in verification is used as a regional node with a strongest computing capability in the regional node cluster, is an active management node in the regional node cluster, and has permission to record the identifier of the video stream in a live broadcast record table of this node.

A plurality of algorithms may be used to implement the contention operation performed by the regional nodes. The following uses one of the algorithms as an example for description. However, this application is not limited to the algorithm. For example, the identifier of the video stream may be converted into an MD5 value, and a regional node that participates in contention repeatedly searches for a numeric value such that after the numeric value, a hash value of a current live broadcast record table, and the MD5 value of the identifier of the video stream are sent to an SHA256 algorithm, a hash value can be calculated to meet a condition (for example, the first 20 bits are all 0), a regional node that first finds out the numeric value is the active management node in the regional node cluster, and the active management node has permission to record the identifier of the video stream and an network address of the regional node 301 as live broadcast information in the live broadcast record table. To determine the active management node, when a regional node announces that it finds a corresponding numeric value, the regional node needs to broadcast, in a system, information including the numeric value, and other regional nodes verify whether a calculation result of a winning node is correct, and broadcast corresponding verification information if the calculation result is correct. At the same time, if another regional node also announces that it finds the corresponding numeric value, the other regional node also broadcasts, in the system, the information including the numeric value, and the other regional nodes perform verification. If a numeric value broadcast by a regional node is first verified by a sufficient quantity of other regional nodes, the regional node is the active management node. The system may set a quantity of regional nodes that need to succeed in verification. For example, only three or more regional nodes succeed in verification or more than half of the regional nodes succeed in verification, it can be determined that the regional node that calculates a result is the active management node, to obtain permission to record the live broadcast information of the video stream in the live broadcast record table. The live broadcast record table may be implemented using a blockchain or a linked list.

The blockchain is a distributed ledger that has a chain data structure formed by sequentially connecting data blocks in a time sequence, and ensures, using a cryptography principle, that the data structure cannot be tampered with or forged. In a blockchain technology, to ensure consistency of blockchain ledgers, each node obtains bookkeeping permission based on a computing capability of the node. To be specific, a winner that participates in contention according to a specified rule obtains permission to record live broadcast information in the blockchain ledgers, and the other nodes synchronize the live broadcast information in changed blockchain ledgers.

The linked list is a non-consecutive and non-sequential storage structure in a physical storage unit. The linked list does not store data in a linear order, but stores the data in each node and has a fixed field for recording a pointer of a next node. In this embodiment of this application, after receiving a live broadcast, a video stream, and an identifier of the corresponding video stream, a regional node writes the identifier of the video stream and information about the regional node into a linked list as live broadcast information.

Step S3: Assuming that the regional node 302 is determined as the active management node, the regional node 302 records live broadcast information of the video stream in a live broadcast record table of the regional node 302. The live broadcast information includes the identifier of the video stream and network information of the regional node 301.

Step S4: After the regional node 302 records the live broadcast information of the video stream in the live broadcast record table of the regional node 302, the other regional nodes in the regional node cluster perform synchronization. Further, the regional node 302 broadcasts an updated live broadcast record table among all the regional nodes in the regional node cluster, and the other regional nodes in the regional node cluster update their own live broadcast record tables based on the live broadcast record table of the regional node 302.

Step S5: The video playing client 305 finds the nearest regional node 303, and sends a video request to the nearest regional node 303. The video request includes an identifier of a video stream to be watched by the video playing client 305 and a network address of the video playing client 305. For ease of description, in this embodiment, the video stream requested by the video playing client 305 is a video stream uploaded by the video collection client 304, and the two video streams have a same video stream identifier.

Step S6: Because the regional node 303 does not have the video stream requested by the video playing end 305, the regional node 303 searches, based on the identifier of the video stream in the video request, a stored live broadcast record table for live broadcast information that has the identifier of the video stream. By searching the live broadcast record table, it is learned that the regional node 301 has the video stream. The regional node 303 pulls a stream from the regional node 301. The regional node 303 sends its own network address to the regional node 301, and requests the regional node 301 to send the video stream sent by the video collection client 304 to the regional node 303.

Step S7: After obtaining, from the regional node 301, the video stream requested by the video playing client 305, the regional node 303 sends the video stream to the video playing client 305.

The following steps (steps S8 to S13) are optional steps for implementing the first embodiment of this application.

Step S8: After the live broadcaster stops live broadcasting or a management background system for managing a live broadcast room and users stops a live broadcast service, the video collection client 304 stops sending the video stream to the regional node 301, generates stop information of the video stream at the same time, and sends the stop information to the regional node 301.

Step S9: When receiving the stop information of the video stream sent by the video collection client 304, the regional node 301 triggers the process of determining, from the regional node cluster, the active management node in the regional nodes. It should be noted that, because the computing capability of the regional node changes, an active management node selected each time is not necessarily the same. In this embodiment, for ease of description, it is still assumed that the regional node 302 is determined as the active management node.

Step S10: After the regional node 302 is determined as the active management node, the regional node 302 records the stop information of the video stream in the live broadcast record table.

Step S11: The other regional nodes in the regional node cluster synchronize an updated live broadcast record table of the regional node 302. Further, the regional node 302 broadcasts the updated live broadcast record table in the regional node cluster, and the other regional nodes in the regional node cluster update their own live broadcast record tables based on the updated live broadcast record table of the regional node 302. According to this method, when the video playing client 305 sends the video request to the regional node 303, and live broadcast of the requested video stream is stopped, the regional node 303 may learn, by searching the live broadcast information table, that the live broadcast of the video stream is stopped, and notify the video playing client 305.

Step S12: The regional node 301 stops sending the video stream to the regional node 303.

Step S13: The regional node 303 stops sending the video stream to the video playing client 305.

Figure 5:
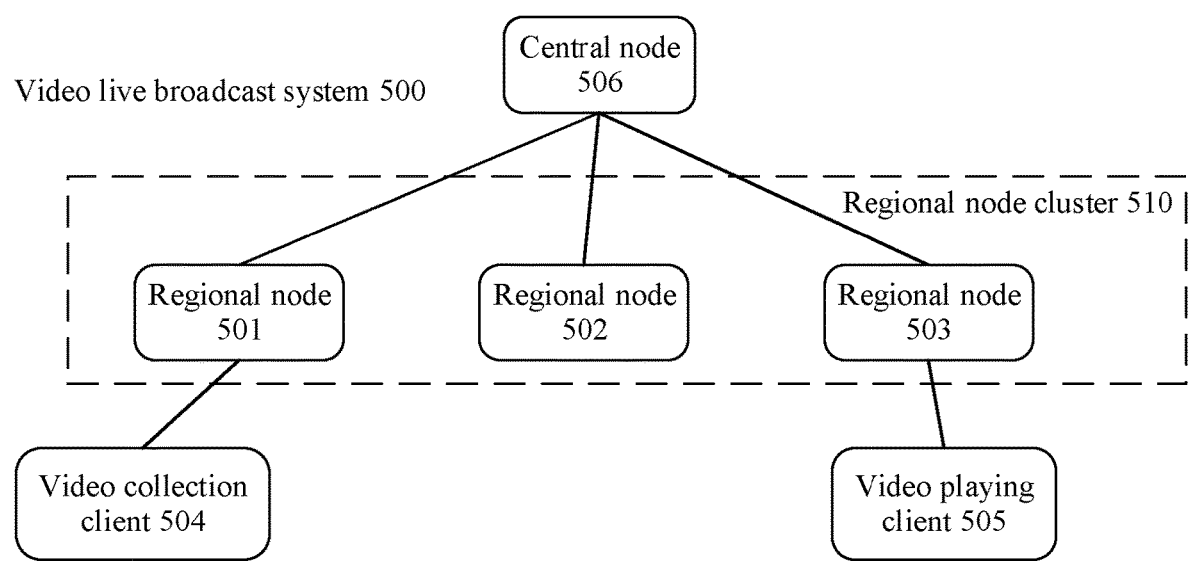
FIG. 5 is a schematic diagram of composition of a video live broadcast system according to a second embodiment of this application.

FIG. 5 is a block diagram of composition of a video live broadcast system according to a second embodiment of this application. As shown in FIG. 5, a video live broadcast system 500 includes a regional node cluster 510 including a regional node 501, a regional node 502, and a regional node 503, a video collection client 504, and a video playing client 505 (there are three regional nodes shown in the figure, and an actual quantity may be two or more). The regional nodes are used to pull and receive video streams in regions of the regional nodes. The video collection client 504 and the regional node 501 are in a same region, and the video playing client 505 and the regional node 503 are in a same region. In this embodiment, a function of a central node 506 is weakened. The central node 506 is mainly used to schedule video streams between the regional nodes, and has a basically same function of processing the video streams as that of the regional nodes. In addition, because the central node 506 usually includes a data center, the central node 506 has a relatively large storage space, and also has functions of daily data collection and video storage.

Figure 6:
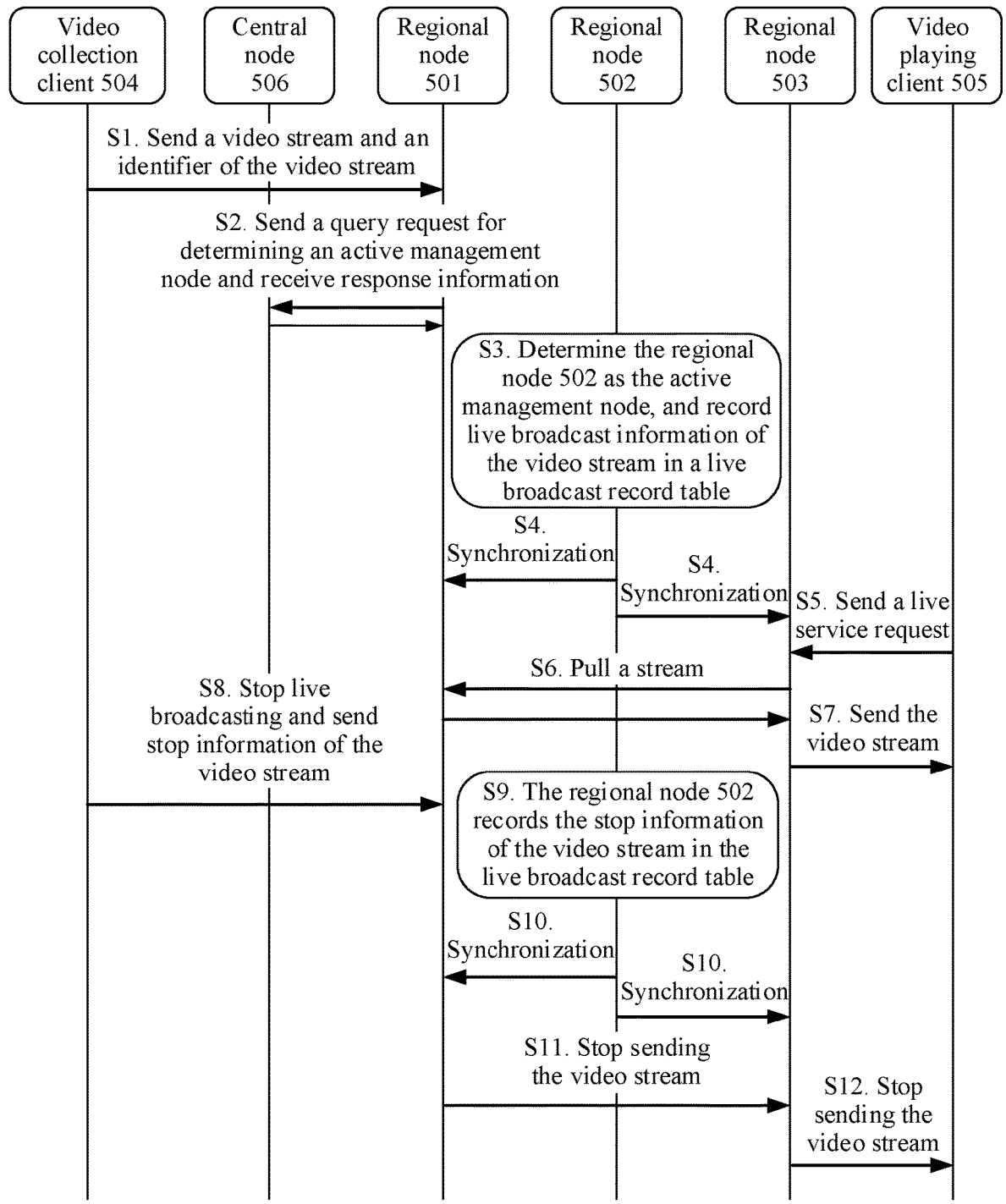
FIG. 6 is a schematic flowchart according to a second embodiment of this application.

FIG. 6 is a schematic flowchart according to the second embodiment of this application. As shown in FIG. 6, specific steps are as follows.

Step S1: The video collection client 504 collects video streams uploaded by a live broadcaster, and generates identifiers of corresponding video streams. The video streams and the identifiers of the video streams are in one-to-one correspondence, and the corresponding video streams may be found using the identifiers of the video streams. In different video live broadcast systems, an identifier of a video stream may include different content. For example, the identifier of the video stream may include registration information of the live broadcaster in the video live broadcast system, a network address of the video collection client, status information of the video stream, and the like.

The video collection client 504 finds the nearest regional node 501 by means of intelligent DNS resolution or IP address library intelligent indexing, and sends the video stream and the identifier of the video stream to the regional node 501. The intelligent DNS resolution means that a plurality of regional nodes is deployed globally for a live broadcast service and a same domain name is used to allow a terminal user to access the service. In addition, each region has its own DNS server using a global load balancing domain name resolution system. Domain name resolution requests of terminals in different regions are resolved by corresponding regional DNS servers, to obtain an IP address of a nearest live broadcast server. In this way, the intelligent DNS resolution allows the user to access different regional nodes based on a geographical location of the user. The IP address library intelligent indexing means that each IP address corresponds to one or more physical addresses, and a large number of IP addresses and corresponding geographical information form an IP address library. Intelligent indexing of the IP address library is established to ensure, as accurately as possible, that global users can access a server of the nearest regional node.

Step S2: When receiving the video stream sent by the video collection client 504 and the identifier of the video stream, the regional node 501 locally stores the video stream. The regional node 501 sends a query request to the central node 506 such that the central node determines a regional node with a highest priority in the regional node cluster as an active management node, and sends network information of the active management node to the regional node 501. In this embodiment, for ease of description, it is assumed that the regional node 502 is the regional node with the highest priority in the regional node cluster. When determining the regional node 502 as the active management node, the central node 506 sends response information to the regional node 501 to notify the regional node 501 that the regional node 502 is the active management node in the regional node cluster.

Step S3: The central node 506 or the regional node 501 notifies the regional node 502 that the regional node 502 is determined as the regional node with the highest priority in the regional node cluster. The regional node 501 further sends the identifier of the video stream to the regional node 502, and the regional node 502 records live broadcast information of the video stream in a live broadcast record table of the regional node 502. The live broadcast information of the video stream includes the identifier of the video stream and information about the regional node 501.

Step S4: After the regional node 502 records the live broadcast information of the video stream in the live broadcast record table of the regional node 502, the other regional nodes in the regional node cluster perform synchronization. Further, the regional node 502 broadcasts an updated live broadcast record table among all regional nodes in the regional node cluster, and the other regional nodes in the regional node cluster update their own live broadcast record tables based on the live broadcast record table of the regional node 502.

Step S5: The video playing client 505 finds the nearest regional node 503, and sends a video request to the nearest regional node 303. The video request includes an identifier of a video stream to be watched by the video playing client 505 and a network address of the video playing client 505. For ease of description, in this embodiment, the video stream requested by the video playing client 505 is a video stream uploaded by the video collection client 504, and the two video streams have a same video stream identifier.

Step S6: Because the regional node 503 does not have the video stream of the video playing end 505, the regional node 503 searches, based on the identifier of the video stream in the video request, a stored live broadcast record table for live broadcast information that has the identifier of the video stream. By searching the live broadcast record table, it is learned that the regional node 501 has the video stream. The regional node 503 pulls a stream from the regional node 501. The regional node 503 sends its own network address to the regional node 501, and requests the regional node 501 to send the video stream sent by the video collection client 504 to the regional node 503.

Step S7: After obtaining, from the regional node 501, the video stream requested by the video playing client 505, the regional node 503 sends the video stream to the video playing client 505.

The following steps (steps S8 to S12) are optional steps for implementing the second embodiment of this application.

Step S8: After the live broadcaster stops live broadcasting or a management background system for managing a live broadcast room and users stops a live broadcast service, the video collection client 504 stops sending the video stream to the regional node 501, generates stop information of the video stream at the same time, and sends the stop information to the regional node 501.

Step S9: In a specific regional node cluster, a regional node with a highest priority as an active management node is unchanged within a period of time. Therefore, the regional node 502 is still the active management node in the regional node cluster.

The regional node 501 sends the stop information of the video stream to the regional node 502, and the regional node 502 records the stop information of the video stream in the live broadcast record table of the regional node 502.

Step S10: After the regional node 502 records the stop information of the video stream in the live broadcast record table of the regional node 502, the other regional nodes in the regional node cluster perform synchronization. Further, the regional node 502 broadcasts an updated live broadcast record table among all the regional nodes in the regional node cluster, and the other regional nodes in the regional node cluster update their own live broadcast record tables based on the live broadcast record table of the regional node 502.

Step S11: The regional node 501 stops sending the video stream to the regional node 503.

Step S12: The regional node 503 stops sending the video stream to the video playing client 505.

Figure 7:
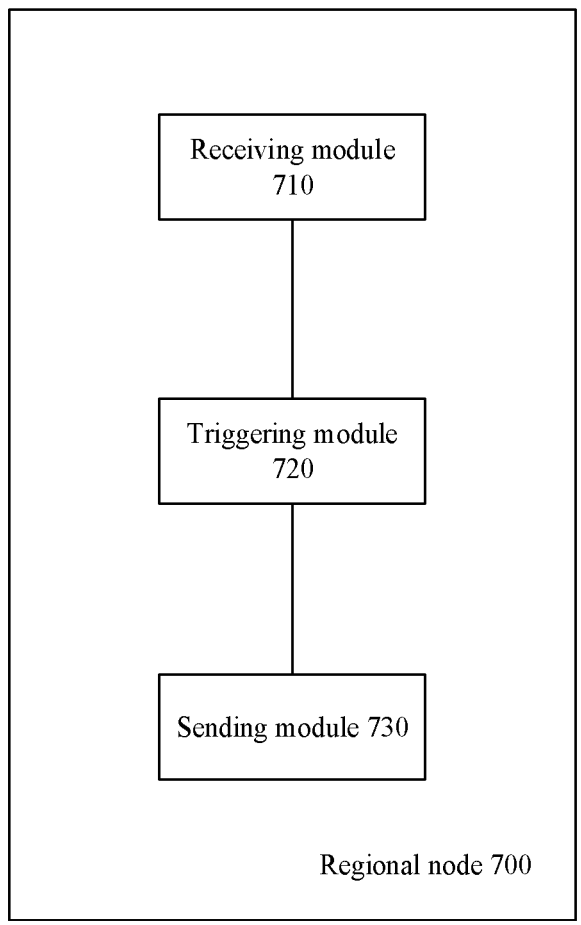
FIG. 7 is a schematic diagram of a functional structure of a regional node according to an embodiment of this application.

Based on the foregoing technical solutions, referring to FIG. 7, an embodiment of this application provides a regional node 700, applied to a video live broadcast system. The regional node may include a server, or may be a software module in a server. The regional node 700 includes a receiving module 710, a triggering module 720, and a sending module 730.

The receiving module 710 is configured to receive data or requests sent by a video collection client, a video playing client, another regional node, and the like.

The triggering module 720 is configured to, when the receiving module 710 receives an identifier of a video stream sent by the video collection client or stop information of the video stream, trigger a process of determining an active management node from a regional node cluster in which the regional node 700 is located.

The sending module 730 is configured to send data or a request to the video playing client, the other regional node, and the like.

Further, when a video collection client in a region of the regional node 700 sends a video stream and an identifier of the video stream to the regional node 700, the receiving module 710 receives the video stream and the identifier of the video stream. The triggering module 720 triggers a process of determining, from the regional node cluster, an active management node corresponding to the video stream, where after the active management node is determined, the active management node records live broadcast information of the video stream in a live broadcast record table stored by the active management node, and synchronizes the live broadcast information of the video stream in a live broadcast record table of another regional node in the regional node cluster, and the live broadcast information of the video stream includes the identifier of the video stream and information about the regional node, the receiving module 710 is further configured to receive a video request sent by another regional node, where the video request carries the identifier of the video stream, the other regional node is a regional node that is in the regional node cluster and that is of a region in which a video playing client configured to request for the video stream is located, and the regional node sends the video request based on the live broadcast information of the video stream in a live broadcast record table stored by the regional node, and the sending module 730 is further configured to send, according to the video request, the video stream sent by the video collection client to the regional node that requests the video stream.

For implementation of a function of the regional node 700 provided in this embodiment of this application, refer to the video live broadcast methods shown in FIG. 4 and FIG. 6.

Figure 8:
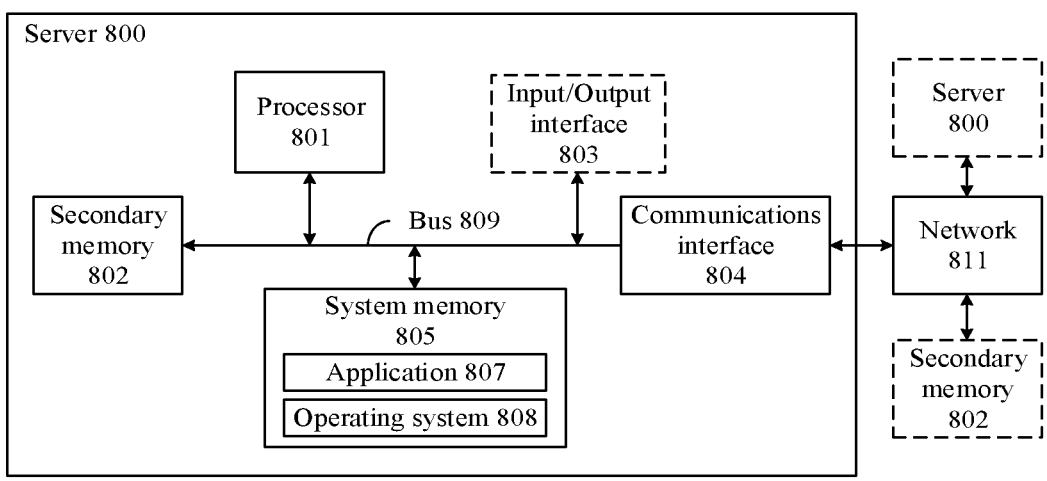
FIG. 8 is a schematic diagram of a structure of a server according to an embodiment of this application.

FIG. 8 is a schematic diagram of a structure of a server 800 according to an embodiment of this application.

As shown in FIG. 8, the server 800 includes a processor 801, and the processor 801 is connected to a system memory 805. The processor 801 may be a central processing unit (CPU), a graphics processing unit (GPU), a field programmable gate array (FPGA), a computing logic such as a digital signal processor (DSP), or any combination of the preceding computing logics. The processor 801 may be a single-core processor or a multi-core processor.

A bus 809 is configured to transfer information between components of the server 800. The bus 809 may use a wired connection manner or a wireless connection manner. This is not limited in this application. The bus 809 is further connected to a secondary memory 802, an input/output interface 803, and a communications interface 804.

The secondary memory 802 is generally also referred to as an external memory. A storage medium of a secondary memory 802 may be a magnetic medium (for example, a FLOPPY DISK, a hard disk, or a magnetic tape), an optical medium (for example, an optical disc), a semiconductor medium (for example, a solid state disk (SSD)), or the like. In some embodiments, the secondary memory 802 may further include a remote memory separate from the processor 801, for example, a network or cluster file system such as a network disk (including a Network File System (NFS)) accessed using the communications interface 804 and a network 811. In this embodiment of this application, the secondary memory 802 is a storage medium of a database storage system, and is configured to store a data duplicate.

The input/output interface 803 is connected to an input/output device, and is configured to receive input information and output an operation result. The input/output device may be a mouse, a keyboard, a display, a compact disc read-only memory (CD-ROM) drive, or the like.

The communications interface 804 uses but is not limited to a transceiver apparatus, for example, a transceiver, to implement communication with another device or the network 811. The communications interface 804 may be interconnected with the network 811 in a wired or wireless manner.

In this embodiment of this application, some features may be implemented/supported by the processor 801 by executing software code in the system memory 805. The system memory 805 may include some software, for example, an operating system 808 (for example, DARWIN, RTXC, LINUX, UNIX, OS X, WINDOWS, or an embedded operating system (such as VXWORKS)), an application 807, and the like.

In addition, FIG. 8 is merely an example of the server 800. The server 800 may include more or fewer components than those shown in FIG. 8, or may have a different component configuration manner. In addition, each component shown in FIG. 8 may be implemented by hardware, software, or a combination of hardware and software.

What is claimed is:

1. A video live broadcast method, wherein the video live broadcast method is implemented by a video live broadcast system, wherein the video live broadcast system comprises a regional node cluster comprising at least two regional nodes, wherein each regional node is configured to couple to a video live broadcast client in a region of a corresponding regional node, and wherein the video live broadcast method comprises:
    receiving, by a first regional node in the regional node cluster, a video stream from a video collection client, wherein the video collection client is a first video live broadcast client in a first region managed by the first regional node;
    triggering, by the first regional node, a first process of determining a first active management node of the video stream from the regional node cluster;
    recording, by the first active management node, live broadcast information of the video stream in a first live broadcast record table of the first active management node, wherein the live broadcast information of the video stream comprises an identifier of the video stream and information about the first regional node;
    updating, by the first active management node, a second live broadcast record table of a second regional node in the regional node cluster with the live broadcast information of the video stream;
    receiving, by the first regional node, stop information of the video stream from the video collection client; and
    triggering, by the first regional node in response to receiving the stop information, a second process of selecting a second active management node of the video stream from the regional node cluster.

2. The video live broadcast method of claim 1, further comprising:
    receiving, by the first regional node, a video request from a third regional node, wherein the video request carries the identifier of the video stream, and wherein the third regional node is in the regional node cluster and sends the video request based on the live broadcast information of the video stream in a third live broadcast record table of the third regional node; and
    sending, by the first regional node according to the video request, the video stream to the third regional node.

3. The video live broadcast method of claim 1, further comprising:
    broadcasting, by the first regional node, information about the video stream and the information about the first regional node;
    performing, by the at least two regional nodes, a contention operation to determine the first active management node;
    sending, by the first active management node, a verification request to the second regional node; and
    sending, by the second regional node, a verification confirmation message to the first active management node, wherein the verification confirmation message indicates that the second regional node agrees to use the first active management node as a recorder of current live broadcast information.

4. The video live broadcast method of claim 3, further comprising:
    storing, by the first active management node using a blockchain account book, the live broadcast information of the video stream in the first live broadcast record table; and
    storing, by the second regional node using the blockchain account book, the live broadcast information of the video stream in the second live broadcast record table.

5. The video live broadcast method of claim 3, further comprising:
    recording, by the second active management node, the stop information of the video stream in a fourth live broadcast record table of the second active management node; and
    updating, by the second active management node, the second live broadcast record table with the stop information of the video stream.

6. The video live broadcast method of claim 1, further comprising:
    sending, by the first regional node, a query request to a central node; and
    receiving, by the first regional node, response information from the central node, wherein the response information carries information about a fourth regional node, and wherein the fourth regional node is the first active management node and has a highest priority in the regional node cluster.

7. The video live broadcast method of claim 6, further comprising:
    storing, by the first active management node using a linked list, the live broadcast information of the video stream in the first live broadcast record table; and
    storing, by the second regional node using the linked list, the live broadcast information of the video stream in the second live broadcast record table.

8. The video live broadcast method of claim 6, further comprising:
    sending, by the first regional node, the stop information of the video stream to the fourth regional node;
    recording, by the fourth regional node, the stop information of the video stream in a fifth live broadcast record table of the fourth regional node; and
    updating, by the fourth regional node, the stop information of the video stream in the second live broadcast record table.

9. A first regional node in a video live broadcast system, wherein the video live broadcast system comprises a regional node cluster comprising at least two regional nodes, wherein each regional node is configured to couple to a video live broadcast client in a region of a corresponding regional node, and wherein the first regional node comprises:
    a memory configured to store a set of instructions;
    a processor coupled to the memory and configured to execute the set of instructions to cause the first regional node to:
        receive a video stream from a video collection client, wherein the video collection client is a first video live broadcast client in a first region managed by the first regional node;
        trigger a first process of determining a first active management node of the video stream from the regional node cluster, recording live broadcast information of the video stream in a first live broadcast record table stored by the first active management node, and updating a second live broadcast record table of a second regional node in the regional node cluster with the live broadcast information of the video stream, wherein the live broadcast information of the video stream comprises an identifier of the video stream and information about the first regional node;

receive, by the first regional node, stop information of the video stream from the video collection client; and trigger, by the first regional node in response to receiving the stop information, a second process of selecting a second active management node of the video stream from the regional node cluster.

10. The first regional node of claim 9, wherein the processor is further configured to execute the set of instructions to cause the first regional node to:

receive a video request from a third regional node, wherein the video request carries the identifier of the video stream, and wherein the third regional node is in the regional node cluster and sends the video request based on the live broadcast information of the video stream in a third live broadcast record table of the third regional node; and send the video stream to the third regional node according to the video request.

11. The first regional node of claim 9, wherein the processor is further configured to execute the set of instructions to cause the first regional node to:

broadcast information about the video stream and the information about the first regional node to enable the at least two regional nodes to perform a contention operation to determine the first active management node;

send a first verification request to the second regional node;

receive a second verification request from the first active management node;

send a verification confirmation message to the first active management node based on the second verification request, wherein the verification confirmation message indicates that the second regional node agrees to use the first active management node as a recorder of current live broadcast information; and receive a third verification request from sent by the first active management node to the second regional node.

12. The first regional node of claim 11, wherein the processor is further configured to execute the set of instructions to cause the first regional node to store, using a blockchain account book, the live broadcast information of the video stream in a fourth live broadcast record table of the first regional node.

13. The first regional node of claim 11, wherein the processor is further configured to execute the set of instructions to cause the first regional node to notify, after the second active management node is determined, the second active management node to record the stop information of the video stream in a fifth live broadcast record table of the second active management node and update the second live broadcast record table with the stop information of the video stream.

14. The first regional node of claim 9, wherein the processor is further configured to execute the set of instructions to cause the first regional node to:

send a query request to a central node to enable the central node to determine a fourth regional node with a highest priority in the regional node cluster as the first active management node; and receive response information from the central node, wherein the response information carries information about the fourth regional node.

15. The first regional node of claim 14, wherein the processor is further configured to execute the set of instructions to cause the first regional node to store the live broadcast information of the video stream in the first live broadcast record table and the second live broadcast record table using a linked table.

16. The first regional node of claim 14, wherein the processor is further configured to execute the set of instructions to cause the first regional node to:

send the stop information of the video stream to the fourth regional node to enable the fourth regional node to write the stop information of the video stream into a sixth live broadcast record table of the fourth regional node; and update the stop information of the video stream in the second live broadcast record table when the fourth regional node records the stop information of the video stream in the sixth live broadcast record table and broadcasts the stop information of the video stream to the second regional node.

17. A computer program product comprising computer-executable instructions stored on a non-transitory computer-readable medium that, when executed by a processor, cause an apparatus to:

receive a video stream from a video collection client, wherein the video collection client is a video live broadcast client in a region managed by a first regional node in a regional node cluster;

trigger a first process of determining a first active management node of the video stream from the regional node cluster, recording live broadcast information of the video stream in a first live broadcast record table of the first active management node, and updating a second live broadcast record table of a second regional node in the regional node cluster with the live broadcast information of the video stream, wherein the live broadcast information of the video stream comprises an identifier of the video stream and information about the first regional node;

receive stop information of the video stream from the video collection client; and trigger, in response to receiving the stop information, a second process of selecting a second active management node of the video stream from the regional node cluster.

18. The computer program product of claim 17, wherein the computer-executable instructions further cause the apparatus to:

receive a video request from a third regional node, wherein the video request carries the identifier of the video stream, and wherein the third regional node is in the regional node cluster and sends the video request based on the live broadcast information of the video stream in a third live broadcast record table of the third regional node; and send the video stream to the third regional node according to the video request.

19. The computer program product of claim 17, wherein the computer-executable instructions further cause the apparatus to:

broadcast information about the video stream and the information about the first regional node in the regional node cluster to enable regional nodes in the regional node cluster to perform a contention operation to determine the first active management node;

send a first verification request to the second regional node;

receive a second verification request from the first active management node;

send a verification confirmation message to the first active management node based on the second verification request, wherein the verification confirmation message indicates that the second regional node agrees to use the first active management node as a recorder of current live broadcast information; and receive a third verification request from sent by the first active management node to the second regional node.

20. The computer program product of claim 17, wherein the computer-executable instructions further cause the apparatus to:

send a query request to a central node to enable the central node to determine a fourth regional node with a highest priority in the regional node cluster as the first active management node; and receive response information from the central node, wherein the response information carries information about the fourth regional node.

* * * * *